(12) United States Patent
Reed

(10) Patent No.: US 9,873,321 B2
(45) Date of Patent: Jan. 23, 2018

(54) VALVE ASSEMBLY FOR A FLOAT VALVE

(71) Applicant: Weir Minerals Australia Ltd., Artamon, New South Wales (AU)

(72) Inventor: David John Reed, Yaroomba (AU)

(73) Assignee: Weir Minerals Australia Ltd., Artarmon, New South Wales (AU)

( * ) Notice: Subject to any disclaimer, the term of this patent is extended or adjusted under 35 U.S.C. 154(b) by 0 days.

(21) Appl. No.: 14/768,396

(22) PCT Filed: Oct. 17, 2013

(86) PCT No.: PCT/AU2013/001202
§ 371 (c)(1),
(2) Date: Aug. 17, 2015

(87) PCT Pub. No.: WO2015/054717
PCT Pub. Date: Apr. 23, 2015

(65) Prior Publication Data
US 2016/0288640 A1    Oct. 6, 2016

(51) Int. Cl.
*F16K 24/04*    (2006.01)
*B60K 15/035*    (2006.01)
*F02M 37/00*    (2006.01)
*F16K 17/04*    (2006.01)
*F16K 24/06*    (2006.01)

(52) U.S. Cl.
CPC ... *B60K 15/03519* (2013.01); *F02M 37/0076* (2013.01); *F02M 37/0082* (2013.01);
(Continued)

(58) Field of Classification Search
CPC ......... B60K 15/03519; F02M 37/0076; F02M 37/0082; F16K 17/0413; F16K 24/044;
(Continued)

(56) References Cited

U.S. PATENT DOCUMENTS 3,674,061 A * 7/1972 Calisher ................. B64D 37/14
137/202
5,308,386 A   5/1994 Wilkes
(Continued)

FOREIGN PATENT DOCUMENTS

| AU | 6265986 B | * | 5/1987 |
| AU | 726581 | | 11/2000 |
| WO | WO 2010/022431 | | 3/2010 |

OTHER PUBLICATIONS

International Search Report dated Jan. 29, 2014 for PCT/AU2013/001202.

*Primary Examiner* — Craig J Price
(74) *Attorney, Agent, or Firm* — Jones Day

(57) ABSTRACT

A valve assembly, that may be used on and/or retrofitted to various float valves, comprising: a relief valve configured to be movable between a closed position and an open position allowing pressure from a container to be relieved through at least one relief hole; a breather float configured to be movable between an open position allowing gas to pass through at least one breather hole and a closed position that substantially prevents liquid from passing through the at least one breather hole; and at least one of: a check valve that is movable between a closed position and an open position allowing gas to be relieved from the container when the container is being filled with liquid; and a breather check valve that is movable between a closed position and an open position allowing filter gas to enter the container when liquid is being removed from the container.

16 Claims, 15 Drawing Sheets

(52) U.S. Cl.
CPC ........ *F16K 17/0413* (2013.01); *F16K 24/044* (2013.01); *F16K 24/06* (2013.01); *Y10T 137/7404* (2015.04)

(58) Field of Classification Search
CPC .. F16K 24/06; F16K 24/042; Y10T 137/7404; Y10T 137/0874; Y10T 137/3099; Y10T 137/7423; Y10T 137/7426; Y10T 137/743; Y10T 137/7433; Y10T 137/7436; Y10T 137/7465; Y10T 137/7771; Y10T 137/7836; Y10T 137/86332
USPC ......... 137/423, 43, 202, 429–433, 442, 493, 137/510, 588; 123/516, 518, 519, 520, 123/198 D
See application file for complete search history.

(56) References Cited

U.S. PATENT DOCUMENTS

| | | | |
|---|---|---|---|
| 7,793,682 B2 * | 9/2010 | Smit | B67D 7/365 137/202 |
| 8,025,076 B2 * | 9/2011 | Smit | B67D 7/365 137/202 |
| 8,402,994 B2 * | 3/2013 | Smit | B67D 7/365 137/202 |
| 8,667,985 B2 * | 3/2014 | Grillmeier | B60K 15/03519 137/493.8 |
| 9,322,486 B2 * | 4/2016 | Smit | B67D 7/365 |
| 2005/0268971 A1 | 12/2005 | Nasalroad et al. | |
| 2006/0162774 A1 * | 7/2006 | Smit | B67D 7/365 137/202 |
| 2011/0214759 A1 * | 9/2011 | Grillmeier | B60K 15/03519 137/511 |

* cited by examiner

VALVE ASSEMBLY FOR A FLOAT VALVE

CROSS REFERENCE

This application is the National Phase application of International Application No. PCT/AU2013/001202, filed Oct. 17, 2013, which designates the United States and was published in English. The foregoing related application, in its entirety, is incorporated herein by reference. This application is further related to U.S. Pat. No. 8,025,076 issued on Sep. 27, 2011; U.S. Pat. No. 7,793,682 issued on Sep. 14, 2010; International Application No. PCT/AU2003/001436, filed Oct. 3, 2003; Australian Provisional Application No. 2002952390, filed Oct. 31, 2002; U.S. Pat. No. 6,311,723 issued on Nov. 6, 2001; and Australian Provisional Application No. PQ0602 filed on May 27, 1999. Each of these applications or patents is incorporated herein by reference in their entirety.

TECHNICAL FIELD

This present disclosure relates to an improved valve assembly that may be used on various float valves. Float valves may be used as a component of a liquid filling system. Certain embodiments relate to a valve assembly that may be used as a component of a fast fill system that allows rapid filling of a container and also protects the container from being overfilled and/or over pressurised. Certain embodiments are directed a system and/or a component of a system that may used to rapidly fill a fuel tank with fuel. The embodiments disclosed herein may also be used to in other suitable applications.

BACKGROUND ART

Large machinery or equipment fitted with fuel tanks is often equipped with a fast fill system to enable rapid filling of large capacity fuel tanks. Some of these systems have a fast fuel valve mounted or associated with the fuel container that permits rapid filling of the fuel container and also a breather valve that permits air to be vented from the container as it fills. The breather valve may also function to reduce the chances of over filling of the container and/or over pressurising of the container during filling. These rapid filling systems are often broken down into non-pressure systems or pressure systems. These fast fuel systems are often used in dusty environments such as a mining site where the introduction of unwanted dirt or other unwanted materials into the system may create problems with the function of the breather valve, the flow valve, and/or other components of the system as well as contaminating the fuel or other liquids being used.

These fast fuel systems typically function by use of a flow control valve that allows a fuel container to rapidly be filled but also have safety features to reduce the chances of over filling the tank, prevent the buildup of pressure within the tank during and after filling, and/or prevent spilling of the fuel. The flow control valve may also prevent the fuel supply nozzle from being overridden, thus preventing the possibility of overfilling. The flow control valve is usually used in conjunction the with breather valve that is used to determine when the level of fuel in the fuel tank is at a desired level. When the desired level of fuel has been attained, the breather valve communicates with the flow control valve to stop the flow of fuel into the container.

One concern with existing systems is as air is vented from the container during filling or when air is drawn back into the system as the fuel is used up, exhaust and/or unwanted dirt and other unwanted materials may be introduced into the container and/or into the components of the fast fuel system. This may cause operational problems and/or reduce the life of certain components of the system. In addition, unwanted particles may also get into the fuel injection system or engine and cause problems with the functioning of the equipment. Unscheduled down time with such equipment is expensive and to be avoided if possible. For example, if unwanted particulates get into the breather valve, then the breather valve may malfunction and this may result in the fuel tank over filling, becoming over pressurised which can potentially cause the container to rupture and/or the spilling of fuel. Another concern is that the breather valve often has an air filter associated with it to filter out unwanted particles during air intake. However, this filter may become clogged prematurely as air containing unwanted particles is exhausted from the container, fuel foams or surges into the filter or combinations thereof. This can prematurely shorten the useful life of the filter. Despite the fact that these fast fueling systems are often used in dusty environments, it is desirable to prevent and/or reduce the introduction of unwanted particles and/or unfiltered air into the system.

One advantage to the present disclosure is the valve assembly portion of the breather valve is configured to open during the filling of the container to allow the displaced exhaust to pass out of the container via an exhaust route but not through the air filter associated with the valve assembly. Another advantage is that after filling of the container, the valve assembly does not allow (or reduces the potential for) unfiltered air and unwanted particles to be drawn into and to contaminate the system. Another advantage is that as air is drawn back into the container via a breather check valve, the air is filtered and only enters (or substantially only enters) the container via a filtered route associated with the valve assembly. Another advantage of the present disclosure is that the valve assembly disclosed herein may be retrofitted to certain existing breather valves (or float control valves). Accordingly, devices, systems, methods of retrofitting, and methods of use for solving these and other problems are desirable. The present disclosure is directed to overcome and/or ameliorate at least one of the disadvantages of the prior art as will become apparent from the discussion herein.

SUMMARY

As well as the embodiments discussed in the summary, other embodiments are disclosed in the specification, drawings and claims. The summary is not meant to cover each and every embodiment, combination or variations contemplated with the present disclosure.

Certain embodiments are directed to a breather valve that may be used in non-pressure fast fill systems. Certain embodiments are directed to a valve assembly that reduces or prevents unwanted materials from impacting the operation of the system. Certain embodiments are directed to a valve assembly that may be easily retrofitted to certain existing valve, float valves and/or float control valves.

Certain embodiments are direct to a valve assembly comprising: a relief valve configured to be movable between a closed position and an open position to allow pressure from a container to be relieved through at least one relief hole; a breather float configured to be movable between an open position to allow gas to pass through at least one breather hole and a closed position that substantially prevents liquid from passing through the at least one breather hole; and at least one or more of the following: a check valve that is movable between a closed position and an open position to allow gas to be relieved from the container when the container is being filled with liquid; and a breather check valve that is movable between a closed position and an open position to allow filter gas to enter the container when liquid is being removed from the container. In certain applications, the valve assembly may be retrofitted to certain existing valves, float valves and/or float control valves.

Certain embodiments are directed to a valve assembly comprising: a check valve comprising: a check valve force transferring member; and a check valve sealing member that is movable between a closed position and an open position by application of a first force to the check valve force transferring member, wherein in the open position the check valve permits gas to be relieved from a container via the check valve when the container is being filled with liquid and, wherein the check valve is in the closed position after filling of the container in order to substantially prevent unfiltered air from entering a portion of the valve assembly and/or the container via the check valve; and a breather check valve comprising: a breather check valve force transferring member; and a breather check valve sealing member that is movable between a closed position and an open position by application of a second force to the breather check valve sealing member to allow filter gas to enter the container via the breather check valve when liquid is being removed from the container, and wherein the breather check valve sealing member is in the closed position during filling of the container to substantially prevent exhaust and/or foam from the container from exiting the container via the breather check valve. In certain applications, the valve assembly may be retrofitted to certain existing valves, float valves and/or float control valves.

Certain embodiments are directed to a valve assembly comprising: a relief valve comprising: a relief valve force transferring member, and a sealing member that is movable between a closed position and an open position by application of a force to the relief valve force transferring member to allow pressure to be relieved from a container through at least one relief hole; a breather float configured to be movable between an open position to allow gas to pass through at least one breather hole and a closed position that substantially prevents liquid from passing through the at least one breather hole; and at least one or more of the following: a check valve comprising: a check valve force transferring member; and a check valve sealing member that is movable between a closed position and an open position by application of a first force to the check valve force transferring member to allow gas to be relieved from the container via the check valve when the container is being filled with liquid; and a breather check valve comprising: a breather check valve force transferring member; and a breather check valve sealing member that is movable between a closed position and an open position by application of a second force to the breather check sealing member to allow filter gas to enter the container when liquid is being removed from the container.

Certain embodiments are directed to a system comprising: a control valve; a bleed line; and a float valve connectable to the control valve via the bleed line, the float valve comprising: a check valve comprising: a check valve force transferring member; and a check valve sealing member that is movable between a closed position and an open position by application of a first force to the check valve force transferring member, wherein in the open position the check valve permits gas to be relieved from a container via the check valve when the container is being filled with liquid and, wherein the check valve is in the closed position after filling of the container in order to substantially prevent unfiltered air from entering a portion of the float valve and/or the container via the check valve; and a breather check valve comprising: a breather check valve force transferring member; and a breather check valve sealing member that is movable between a closed position and an open position by application of a second force to the breather check valve sealing member to allow filter gas to enter the container via the breather check valve when liquid is being removed from the container, and wherein the breather check valve sealing member is in the closed position during filling of the container to substantially prevent exhaust and/or foam from the container from exiting the container via the breather check valve.

Certain embodiments are to a valve assembly comprising or including: a housing; a relief valve comprising or including: a relief valve spring; and a relief plate that is movable between a closed position and an open position by compression of the relief valve spring to allow pressure to be relieved from the container through at least one relief hole; a breather float configured to be movable between an open position to allow gas to pass through at least one breather hole located in the relief plate and a closed position that prevents liquid from passing through the at least one breather hole; a breather assembly comprising or including: a check valve comprising: a check valve spring; and a check valve poppet plate that is movable between a closed position and an open position by compression of the check valve spring to allow gas to be relieved from the container when the container is being filled with liquid; and a breather check valve comprising or including: a breather check valve spring; and a breather check valve poppet plate that is movable between a closed position and an open position by compression of the breather check valve spring to allow gas to enter the container when liquid is being removed from the container. In certain applications, the valve assembly further comprises a filter for filtering the gas before the gas enters the container. In certain applications, the valve assembly is used as a component of a non-pressure fast fill system.

Certain embodiments are to a valve assembly comprising or including: a check valve comprising or including: a check valve spring; and a check valve poppet plate that is movable between a closed position and an open position by compression of the Check valve spring to allow gas to be relieved from the container when the container is being filled with liquid; and a breather check valve comprising: a breather check valve spring; and a breather check valve poppet plate that is movable between a closed position and an open position by compression of the breather check valve spring to allow gas to enter the container when liquid is being removed from the container; wherein the valve assembly may be retrofitted to an existing portion of a float valve and the portion of the float valve further comprises or includes: a housing a relief valve comprising or including: a relief valve spring; and a relief plate that is movable between a closed position and an open position by compression of the relief valve spring to allow pressure to be relieved from the container through at least one relief hole; a breather float configured to be movable between an open position to allow gas to pass through at least one breather hole located in the relief plate and a closed position that prevents liquid from passing through the at least one breather hole.

Certain embodiments are to a system comprising or including: a control valve; a bleed line; and a float valve connectable to the control valve via the bleed line, the float valve comprising or including: an aperture for connecting the bleed line to the float valve; a housing comprising a housing wall, a passageway that extends through the housing, and at least one hole through a wall of the housing; a liquid inlet, the liquid inlet allowing liquid to pass into the passageway of the housing; a liquid chamber located adjacent to the liquid inlet into which liquid is passed before entering the passageway through the liquid inlet; an inlet float valve located within the housing and comprising a float and a stem, the inlet float valve movable between an open position that permits the flow of liquid through the liquid inlet into the passageway and through the at least one hole and a closed position that does not permit the flow of liquid through the liquid inlet into the passageway and through the at least one hole; a shelter located within the liquid chamber in which an end of the stem is located when the float valve assembly is in the open position to reduce turbulence created by liquid passing through the chamber; a relief valve comprising or including: a relief valve spring; and a relief plate that is movable between a closed position and an open position by compression of the relief valve spring to allow pressure to be relieved from the container through at least one relief hole; a float configured to be movable between an open position to allow gas to pass through at least one breather hole and a closed position that prevents liquid from passing through the at least one breather hole; a valve assembly comprising: a check valve comprising: a check valve spring; and a check valve poppet plate that is movable between a closed position and an open position by compression of the check valve spring to allow gas to be relieved from the container when the container is being filled with liquid; and a breather check valve comprising or including: a breather check valve spring; and a breather check valve poppet plate that is movable between a closed position and an open position by compression of the breather check valve spring to allow liquid to enter the container when liquid is being removed from the container; wherein the passageway is fluidly connected to the aperture through the liquid inlet and the liquid chamber.

In certain applications, the valve assembly may be configured to substantially reduce one or more of the following: contamination of the liquid in the container, impedance of the proper operation of the valve assembly, the accumulation of unwanted particles in the valve assembly, impedance of the proper operation of other components of the fast fill system, the accumulation of unwanted particles in other components of the fast fill system, the contamination of the filter that is in gas communication with the check valve from exhaust, foam and or liquid from the liquid container, impedance of the proper operation of the equipment associated with the liquid container and the accumulation of unwanted particles and/or other substances in the equipment associated with the liquid container.

BRIEF DESCRIPTION OF THE DRAWINGS

These and other features, aspects, and advantages of the present disclosure will become better understood with regard to the following description, appended claims, and accompanying figures where

DETAILED DESCRIPTION

Figure 1:
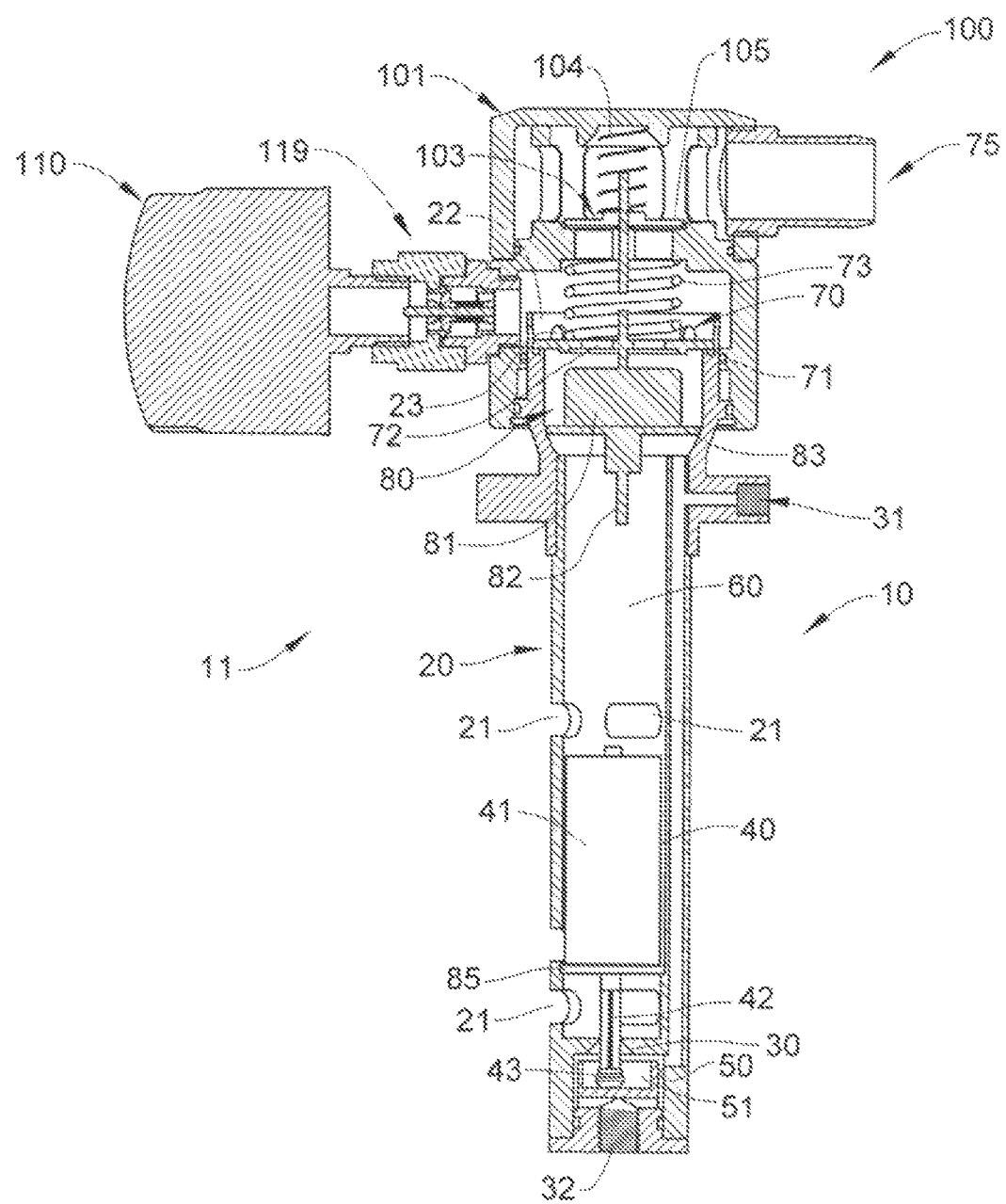
FIG. 1 is a section side view of a valve assembly with a float valve and an inlet float valve in an open position, according to certain embodiments.

The present disclosure will now be described in detail with reference to one or more embodiments, examples of which are illustrated in the accompanying drawings. The examples and embodiments are provided by way of explanation and are not to be taken as limiting the scope of the disclosure. Furthermore, features illustrated or described as part of one embodiment may be used by themselves to provide other embodiments and features illustrated or described as part of one embodiment may be used with one or more other embodiments to provide a further embodiments. It will be, understood that the present disclosure will cover these variations and embodiments as well as other variations and/or modifications.

It will be understood that the term "comprise" and any of its derivatives (e.g., comprises, comprising) as used in this specification is to be taken to be inclusive of features to which it refers, and is not meant to exclude the presence of any additional features unless otherwise stated or implied.

The features disclosed in this specification (including accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

The subject headings used in the detailed description are included only for the ease of reference of the reader and should not be used to limit the subject matter found throughout the disclosure or the claims. The subject headings should not be used in construing the scope of the claims or the claim limitations.

Certain embodiments of the present disclosure are directed to reducing and/or preventing unwanted materials from impacting on the operation of non-pressure fast fill systems by improving how the valve assembly handles gas being exhausted from the system and gas being drawn into the system.

In certain embodiments of the valve assembly disclosed herein, the components of that assembly function in various combinations to more effectively reduce the chances of, or prevent contamination of the system during filling of the liquid container and/or during use of the equipment that the liquid container is associated with. For example, one of the purposes of the breather check valve when it is in the closed position during filling of the container is to substantially prevent exhaust from the container from entering the filter via the breather check valve during the filling of the container. Another purpose of the breather check valve when it is in the closed position during liquid filling of the container is to substantially prevent liquid foaming from contaminating the filter. Another purpose of the breather check valve when it is in the closed position during liquid surges in the container is to substantially prevent liquid surges from contaminating the filter. In certain embodiments, when the breather check valve is in a closed position during operation one or more of the following may result: substantially prevent exhaust from the container from entering the filter; substantially prevent liquid foaming from contaminating the filter; and substantially prevent liquid surges from contaminating the filter.

With respect to the check valve after filling of the container, the check valve is held in a closed position in order to substantially prevent unfiltered air and/or unwanted particles from contaminating certain portions of the valve assembly and/or container via the check valve. By closing off this exhaust route to the outside environment when the equipment is in operation, the opportunities for unwanted materials to enter the system are substantially reduced. For example, if unwanted particulates enter certain portions of the valve assembly, then the operation of the valve assembly or the float may be degraded. In addition, the unwanted particulates may contaminate the liquid (or fuel) in the container and cause downstream problems with the operation of the equipment, for example, clogged valves in the engine, clogged fuel lines, and so on.

FIG. 1 shows a float valve assembly 11 including an upper portion being the valve assembly 100 and a lower portion the float valve portion 10, according to certain embodiments. The float valve assembly 11 may be attached to a liquid container such as a fuel tank 1 depicted in FIG. 6. This is also depicted in FIGS. 13A and 13B, FIG. 14 and FIG. 15. In certain applications, the float valve may be directly and/or indirectly attached to the liquid container. For example, in certain applications, the float valve assembly may be attached to a hose that is attached to the container. In this instance (not shown in the figures), the float valve assembly 11 is indirectly attached to the container. In certain applications, the float valve assembly may be attached to the container via some intermediary structure such as an adaptor and so forth. The valve assembly 100 may be attached to, retrofitted to, and/or used in conjunction with the float valve portion 10. The valve assembly may also be attached to, retrofitted to, and/or used in conjunction with other valves or structures that are suitable for monitoring liquid levels in containers. The valve assembly 100 is depicted in herein as being used with a particular fast fill system and a particular float valve 10, however, it is to be understood this is for illustration purposes and is not limiting as to the applicability of the valve assembly to other suitable fast fill systems, other suitable applications and/or other suitable float valves.

Figure 6:
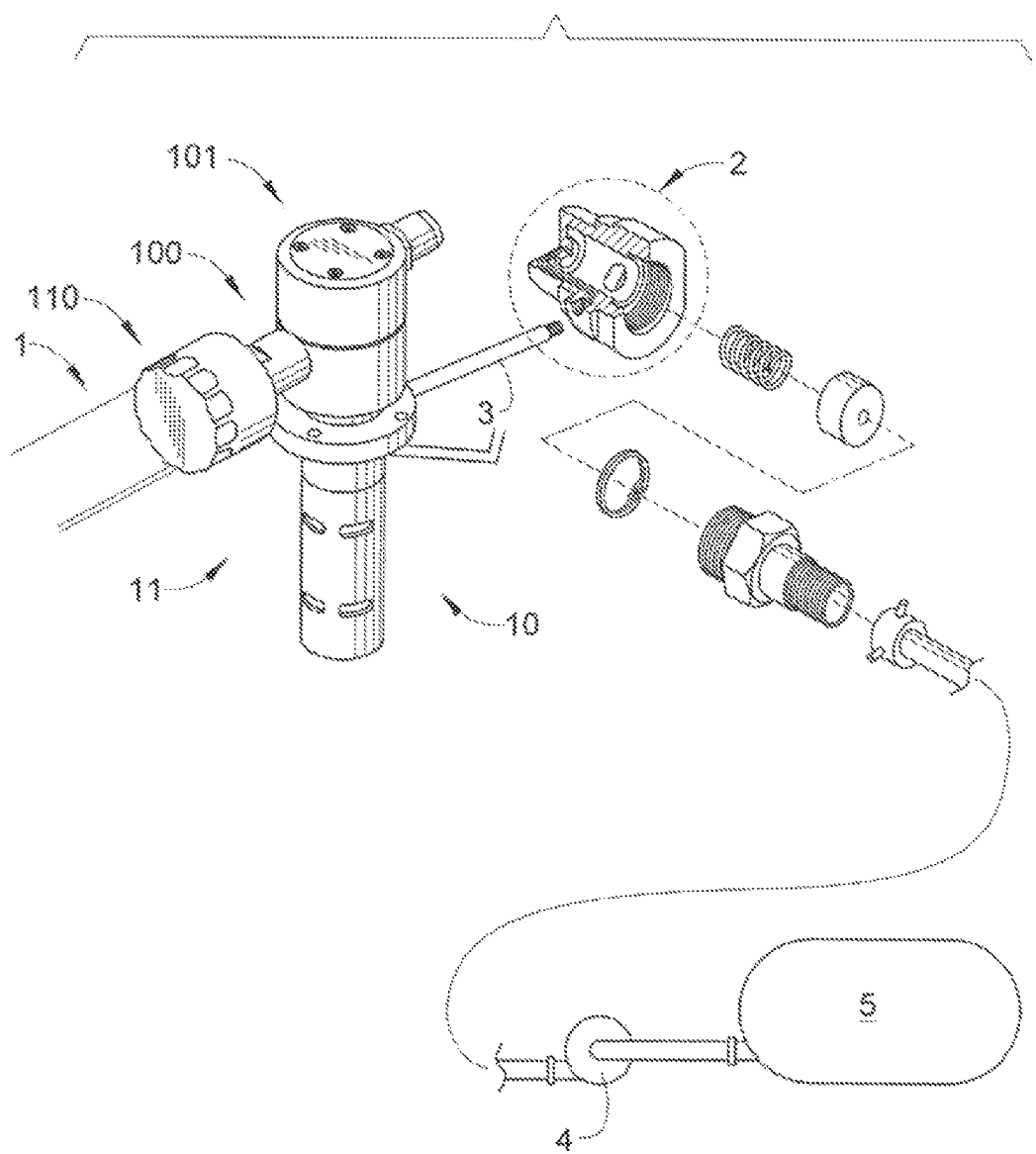
FIG. 6 is a schematic representation of the valve assembly fitted to a float valve which is connected to a control valve.
Figure 7:
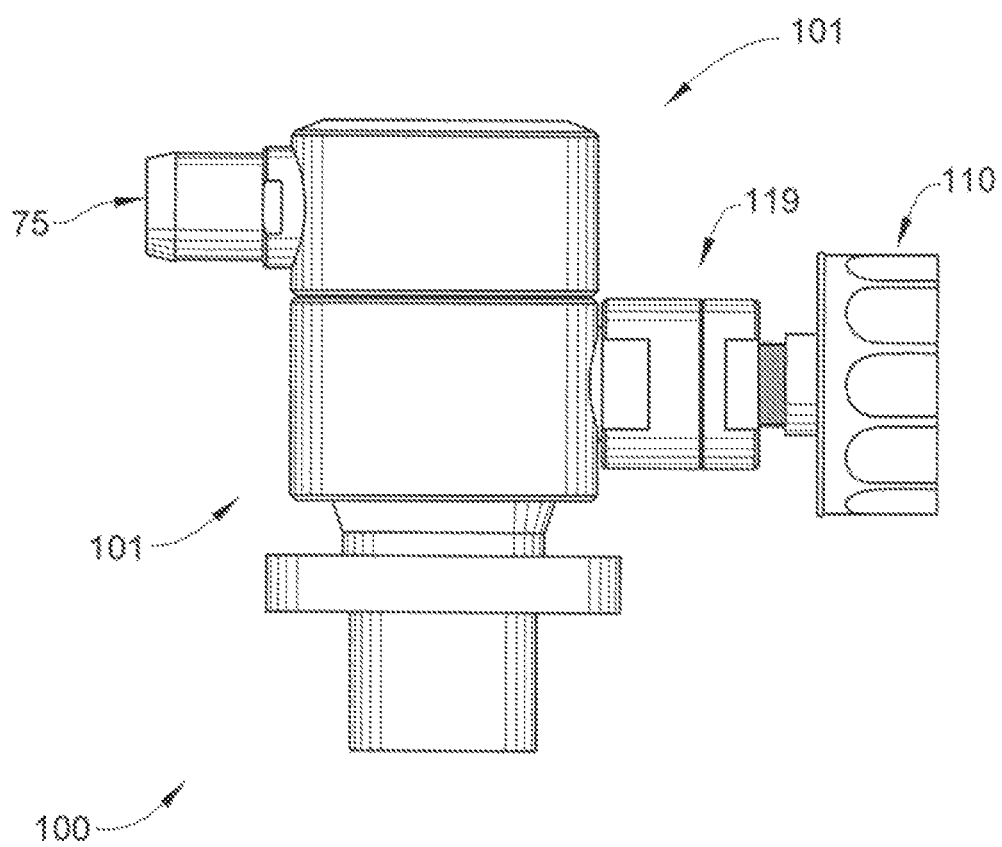
FIG. 7 is an exterior side isometric view of the valve assembly of FIG. 4.
Figure 13A:
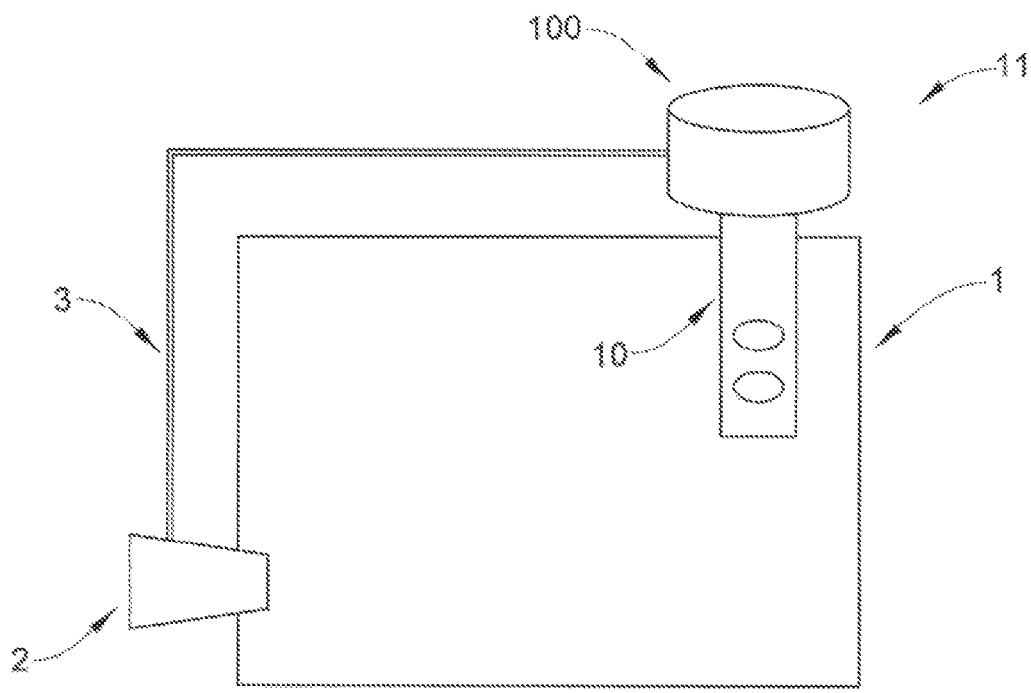
FIGS. 13A and 13B are schematic illustrations of a fast fill system installed on a container, according to certain embodiments.
Figure 13B:
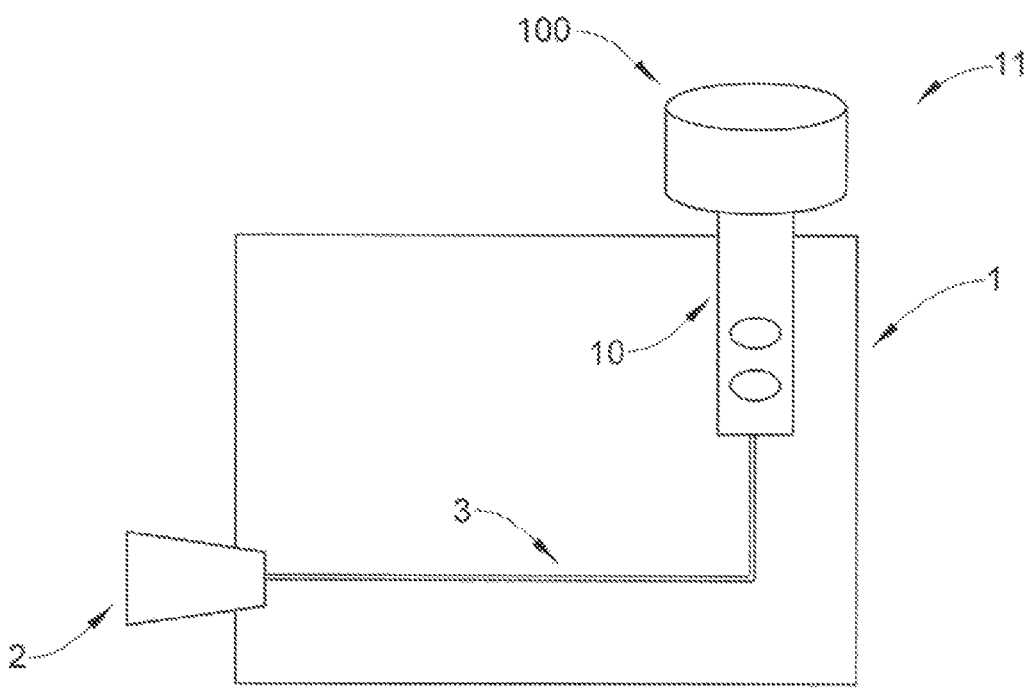
Figure 14:
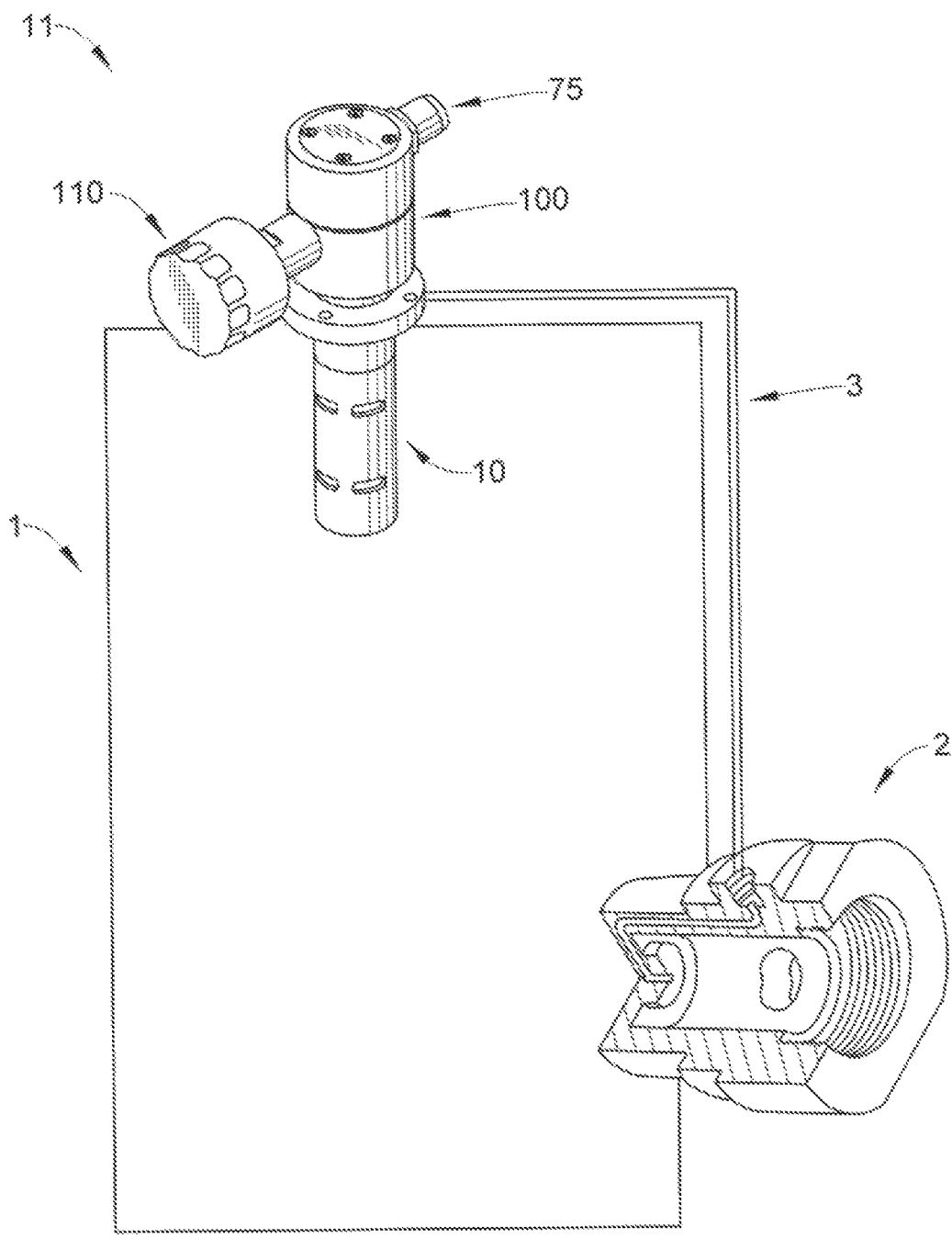
FIG. 14 is schematic illustration of a fast fill system installed on a container, according to certain embodiments.
Figure 15:
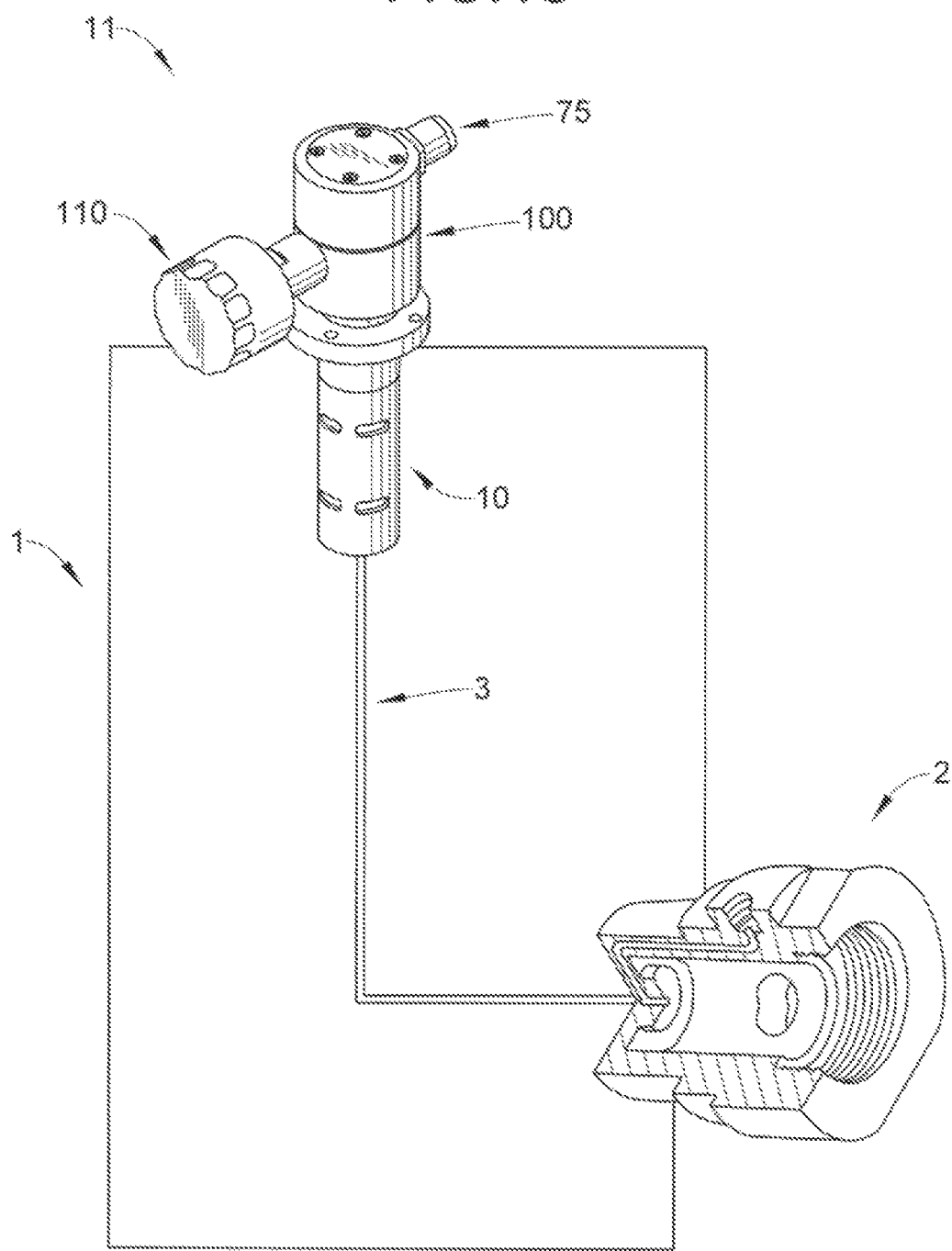
FIG. 15 is schematic illustration of a fast fill system installed on a container, according to certain embodiments.

The float valve assembly 11 shown in FIG. 1 may be used with a control valve (such as the control valve 2 illustrated in FIG. 6, see also FIGS. 13A and 13B, FIG. 14 and FIG. 15), to prevent liquid from entering the liquid tank when the level of the liquid in the liquid tank has reached a predetermined level. FIG. 6 shows the float valve assembly (made up of the valve assembly 100 and the float valve 10) connected to the control valve 2 via a bleed line 3, according to certain embodiments. This is also depicted in FIGS. 13A and 13B, FIG. 14 and FIG. 15. FIG. 13B and FIG. 15 both illustrate a configuration of systems where the bleed line is located within the liquid container, according to certain embodiments. FIG. 13A and FIG. 14 both illustrate a configuration of systems where the bleed line is exterior to the liquid container. The control valve 2 may be connected to a liquid pump 4 and supply tank 5 also schematically shown in FIG. 6. With respect to application areas, certain of the disclosed embodiments may be used in applications where liquid is being added to a container. Certain embodiments are directed to fast filling systems where it is desirable to add liquids to a container in a fast and/or safe manner. The equipment may be stationary or moving or a combinations thereof. One example of this is fast filling of fuel to large pieces of stationary and/or moving equipment that are used in the oil and gas, mining and/or related industries, such as diggers, haul trucks and graders. Another example would be to add fuel to locomotives used in the transport industry. Another example would be to add fuel to trucks used in the hauling and/or transport industry. In certain applications the size of the containers to be filled may vary from 50 gallons up to 10,000 gallons. In certain applications, the container to be filled may be between 400 gallons to 6000 gallons, 600 gallons to 1000 gallons or 1000 gallons to 4000 gallons. Other sized containers may also be filled using certain disclosed embodiments.

In certain disclosed embodiments, the term 'fast filling' and/or 'fast fueling' may mean a filling rate of between 25 gallons per minute to 1000 gallons per minute, 50 gallons per minute to 125 gallons per minute, 80 gallons per minute to 140 gallons per minute, 75 gallons per minute to 125 gallons per minute, 100 gallons per minute to 200 gallons per minute, 125 gallons per minute to 225 gallons per minute, 150 gallons per minute to 280 gallons per minute 200 gallons per minute to 600 gallons per minute, 200 gallons per minute to 400 gallons per minute or 300 gallons per minute to 800 gallons per minute. In certain disclosed embodiments, the term fast filling and/or fast fueling may mean a filling rate of at least 25 gallons per minute, 50 gallons per minute, 75 gallons per minute, 100 gallons per minute, 125 gallons per minute, 140 gallons per minute, 160 gallons per minute, 180 gallons per minute, 200 gallons per minute, 225 gallons per minute 250 gallons per minute 275 gallons per minute, 300 gallons per minute, 400 gallons per minute, 500 gallons per minute, 600 gallons per minute or 800 gallons per minute.

In certain embodiments, the float valve portion 10 comprises a housing 20 that is hollow and substantially cylindrical in shape. Other suitable shapes to the housing are also contemplated. The housing 20 has several holes 21 located along its length that allow liquid located within the liquid tank to pass in and out of the housing 20.

An inlet 30 is provided at a lower end of the housing 20 through which passes liquid. The inlet 30 is fluidly connected to two separate screw threaded apertures 31 and 32. The bleed line 3 is connected to one of the apertures 31 or 32. In certain embodiments, the bleed line is fluidly connected to the flow control valve to activate the flow control valve. The screw-threaded apertures 31 and 32 allow the bleed line to be connected outside or inside of the liquid tank. This is further illustrated in the various alternative embodiments shown in FIGS. 13A and 13B, FIG. 14 and FIG. 15. The communication between the flow control valve and the float valve assembly 11 may also be achieved using other mechanical, electrical approaches or combinations thereof.

As shown in FIG. 1, an inlet float valve 40 is housed in a lower end of the housing 20. The inlet float valve 40 is formed from an inlet float 41 and stem 42. A valve seal 43 is located adjacent the end of the stem 42 for sealing the inlet 30.

The inlet float valve 40 is mounted within the housing so that the stem 42 can reciprocate between an open position, in which liquid is able to pass through the bleed line 3 and through the inlet 30 into the liquid tank 1, and a closed position that prevents the flow of liquid through the inlet.

A liquid chamber 50 is located between the inlet 30 and the apertures 31 and 32. The liquid chamber 50 provides a shelter 51 in which an end of the stem 42 is located when the inlet float valve 40 is in the open position.

Figure 4:
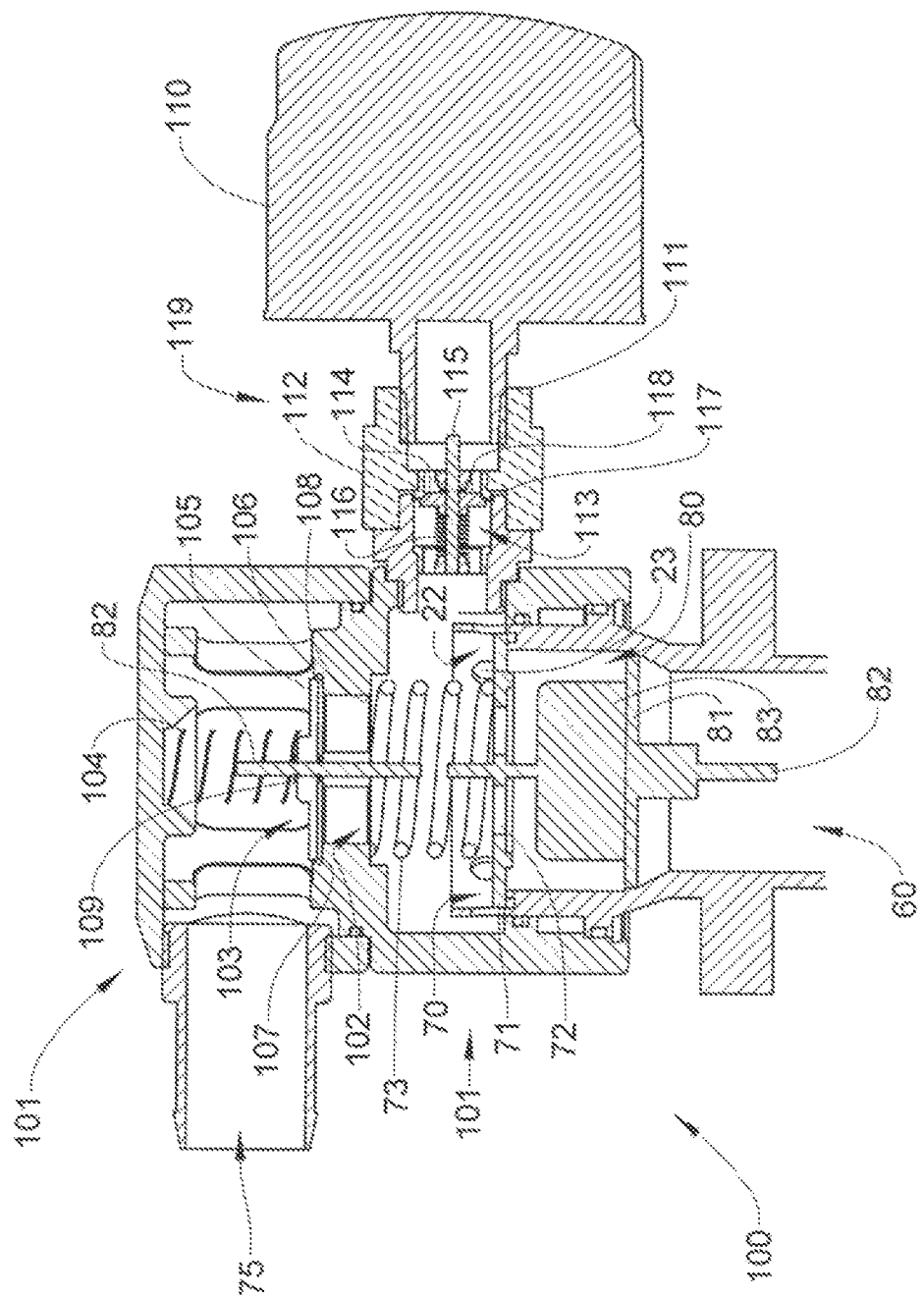
FIG. 4 is a sectional side view of a valve assembly, according certain embodiments.

As shown in FIG. 1 and FIG. 4, in this exemplary embodiment, a portion of the housing 20 of the float valve 11 is open so that a passageway 60 is provided between the inside and outside of the liquid tank. This allows gas to pass from within the liquid tank to the atmosphere via the outlet 75 of the valve assembly 100 so that the liquid tank does not rupture or over-pressurise during filling of the liquid tank. During filling of the liquid container, an exhaust route is provide through the valve assembly 100. A relief plate 71 is positioned within the top cap housing 101. Breather holes 72 are located within the relief plate 71. The breather holes 72 form part of the exhaust route. In addition, during filling of the liquid container a check valve 103 is moved to an open position due to the pressure from the air seeking to escape from the liquid container as the container is filled (see also FIG. 4). The air pressure from the container results in a force being applied to the sealing member 105 of the check valve and then to the force transferring member 104 of the check valve moving the check valve to an open position. Once the check valve is opened air may be exhausted from the float valve assembly via the exhaust port 75. In certain embodiments, the cylinder housing does not have to extend up to the valve assembly housing but may be connected by at least one pipe, hosing and/or other suitable structures. The cylindrical housing may be in direct and/or indirect fluid communication with the valve assembly.

Figure 5:
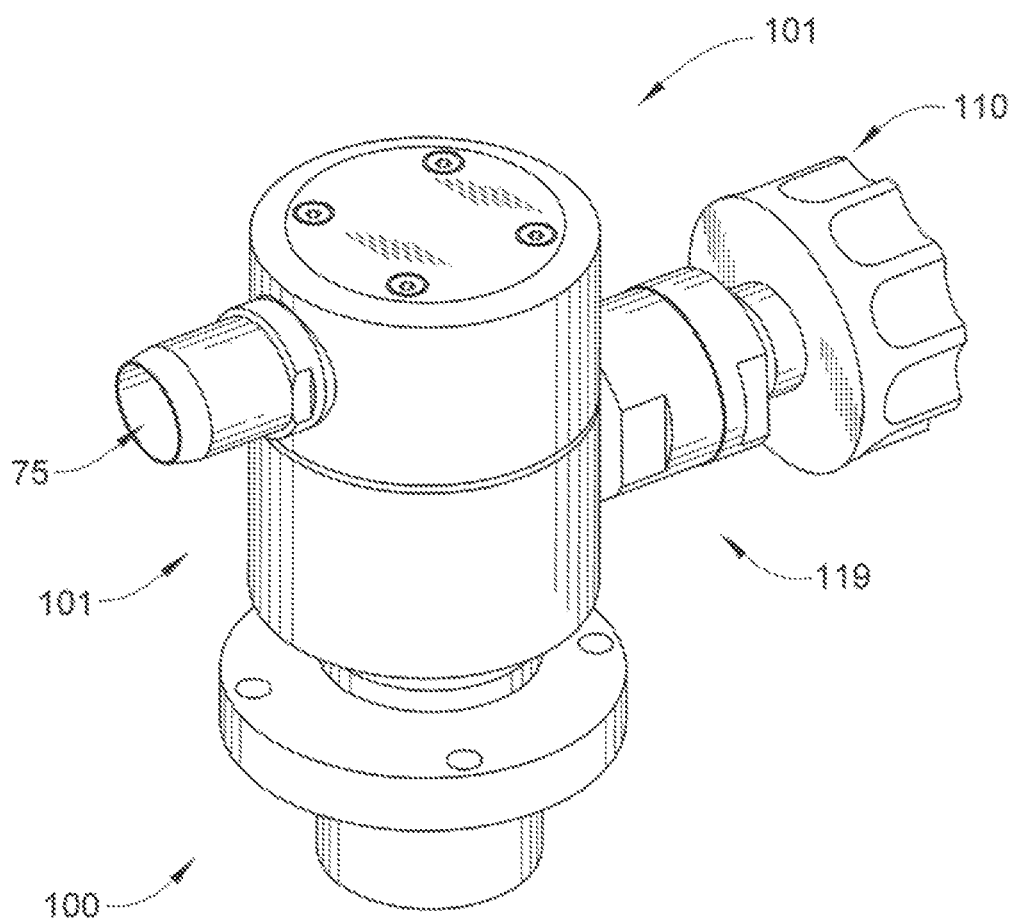
FIG. 5 is an exterior isometric perspective view of the valve assembly of FIG. 4.
Figure 8:
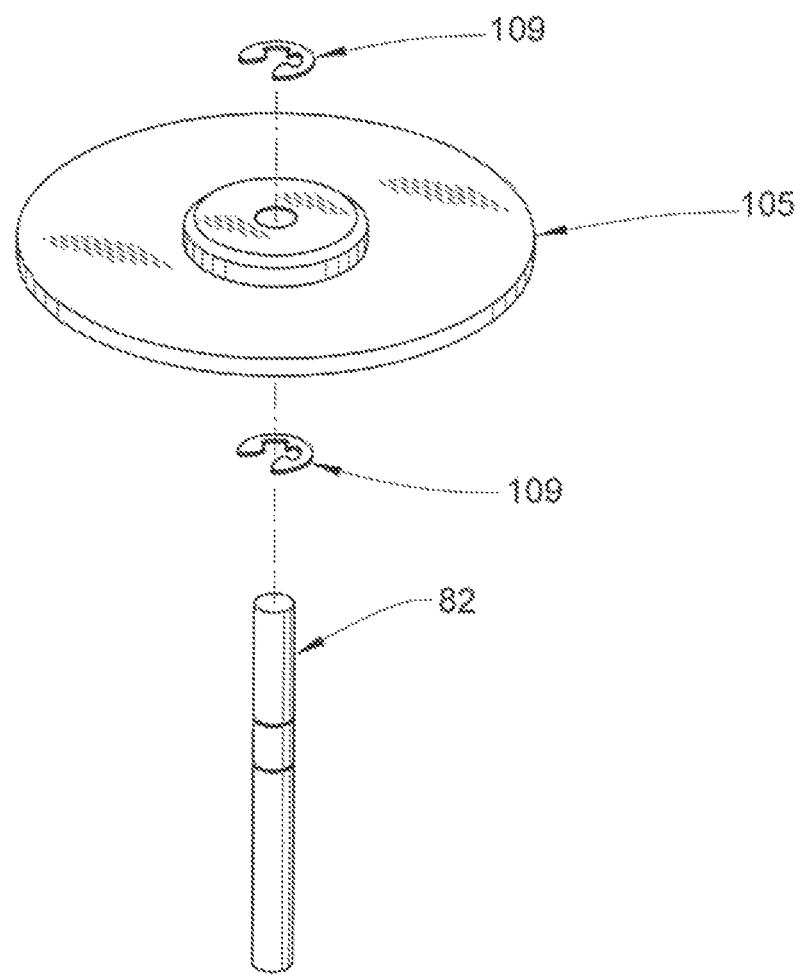
FIG. 8 is an exploded of a portion of the check valve of FIG. 4.
Figure 11:
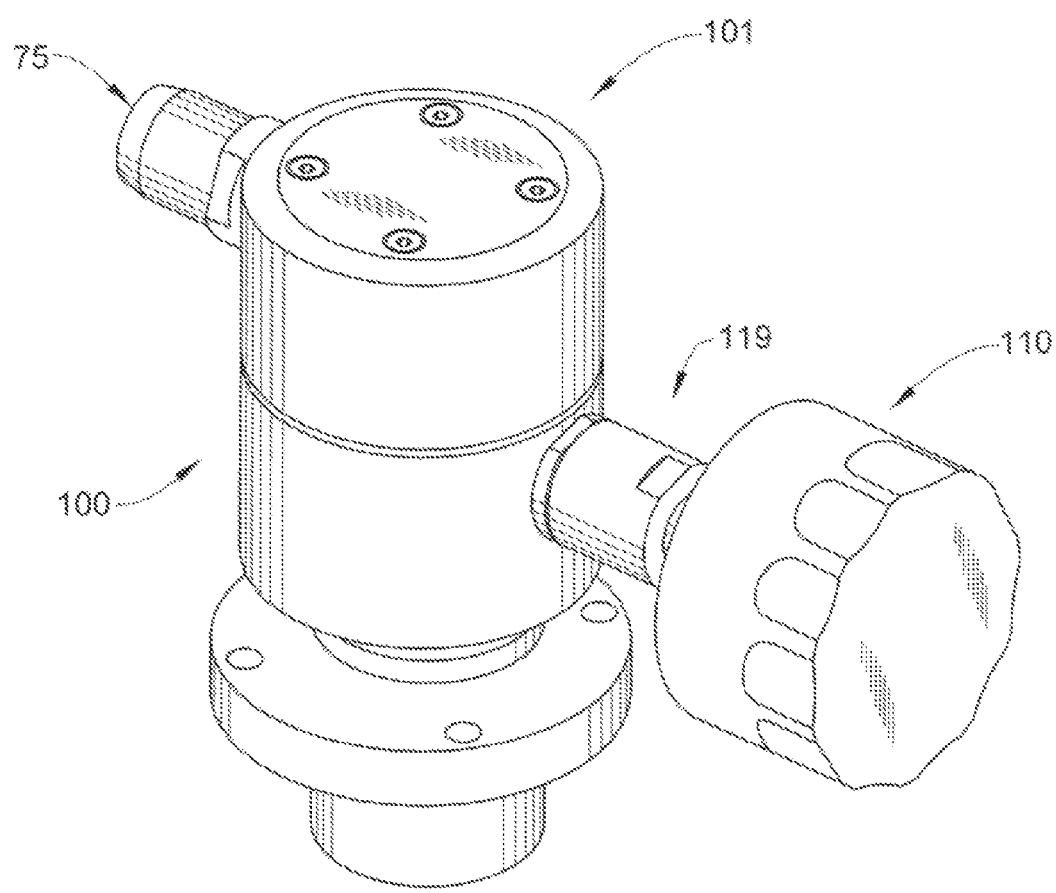
FIG. 11 is an exterior isometric perspective side view of a valve assembly, according to certain embodiments.
Figure 12:
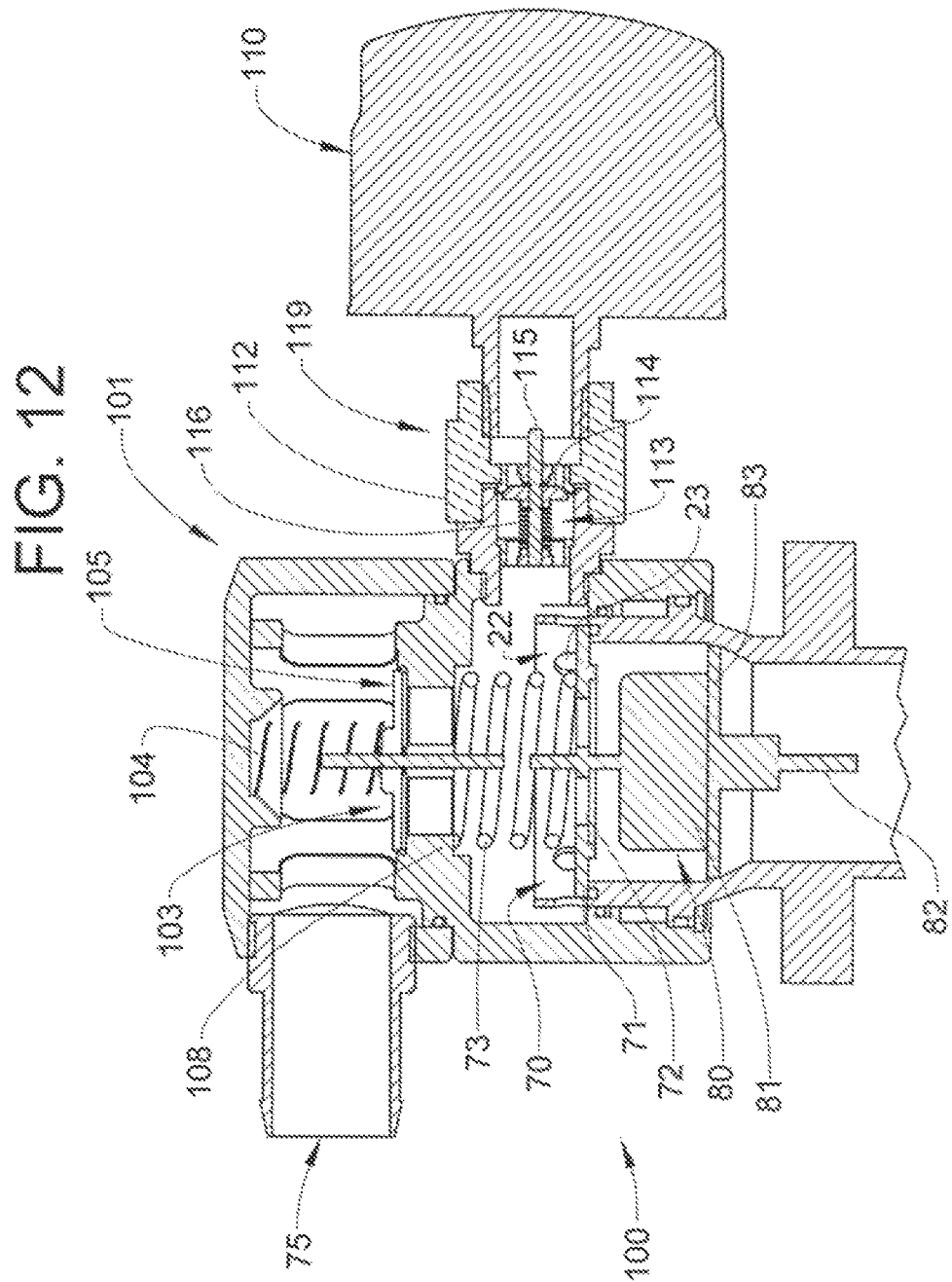
FIG. 12 is a sectional side view of a check valve, according to certain embodiments.

FIG. 4 further illustrates additional details of the valve assembly, according to certain embodiments. In this exemplary embodiment, the valve assembly 100 of the float valve assembly 11 includes a check valve 103. The check valve 103 may be formed from a light weight spring 104 (i.e., force transferring member) and sealing member 105. Other force transferring member structures or mechanisms may also be used. A portion of shaft 82 that at least in part extends through and a central portion of a poppet disc 105. The poppet disc is merely illustrative of a sealing member that may be used. Other sealing member structures or mechanisms may also be used. The poppet disc 105 sits, in its closed position, on an o-ring 106. As shown on FIG. 8, the poppet disc is attached to the shaft 82 with two circlips 109. Other ways of attaching the poppet disc to the shaft may also be used. The o-ring 106 is seated on an interior seating portion 107 of the valve assembly housing. When the container is not being filled and the check valve is in a closed position, the poppet disc 105 is held against the o-ring 106 by the light weight spring 104. This closed position substantially prevents exhaust from venting out of the container via the breather assembly. The closed position of the check valve 103 also substantially prevents unfiltered gas and/or unwanted particles from entering the valve assembly and ending up in the valve assembly and/or in the liquid container. One of the functions and advantages of the check valve 103 is to substantially prevent unfiltered gas and/or unwanted particles from being drawn back into the valve assembly and/or the liquid container via the check valve. These liquid containers, for example a fuel tank, are often mounted on equipment (stationary or moving) that may be operating in a dirty or dusty environment where unfiltered gas and/or unwanted particles may enter the valve assembly and/or liquid container and cause one or more of the following problems: contaminate the liquid in the container, impede the proper operation of the valve assembly, impede the proper operation of other components of the fast fill system, and impede the proper operation of the equipment associated with the liquid container. For example, if unwanted particles or fluids get into the engine of the equipment associated with the liquid container this may cause deterioration in the performance of the engine and/or result in more frequent maintenance on the engine. When the liquid container is being filled with fluid (for instance, fuel) the gas being displaced from the container will urge the poppet disc 105 upwards along shaft 82 overcoming the downward pressure of the light weight spring 104, thus allowing the displaced gas to vent from the container and the valve assembly via vent hole 75. FIG. 5 illustrates an exterior perspective view of the valve assembly of FIG. 4. FIG. 6 illustrates and exterior side perspective view of the valve assembly of FIG. 4. FIG. 11 illustrates an exterior perspective view of a valve assembly, according to certain embodiments. Other suitable structures may also be used in place of the check valve configuration illustrated in this embodiment.

Figure 9:
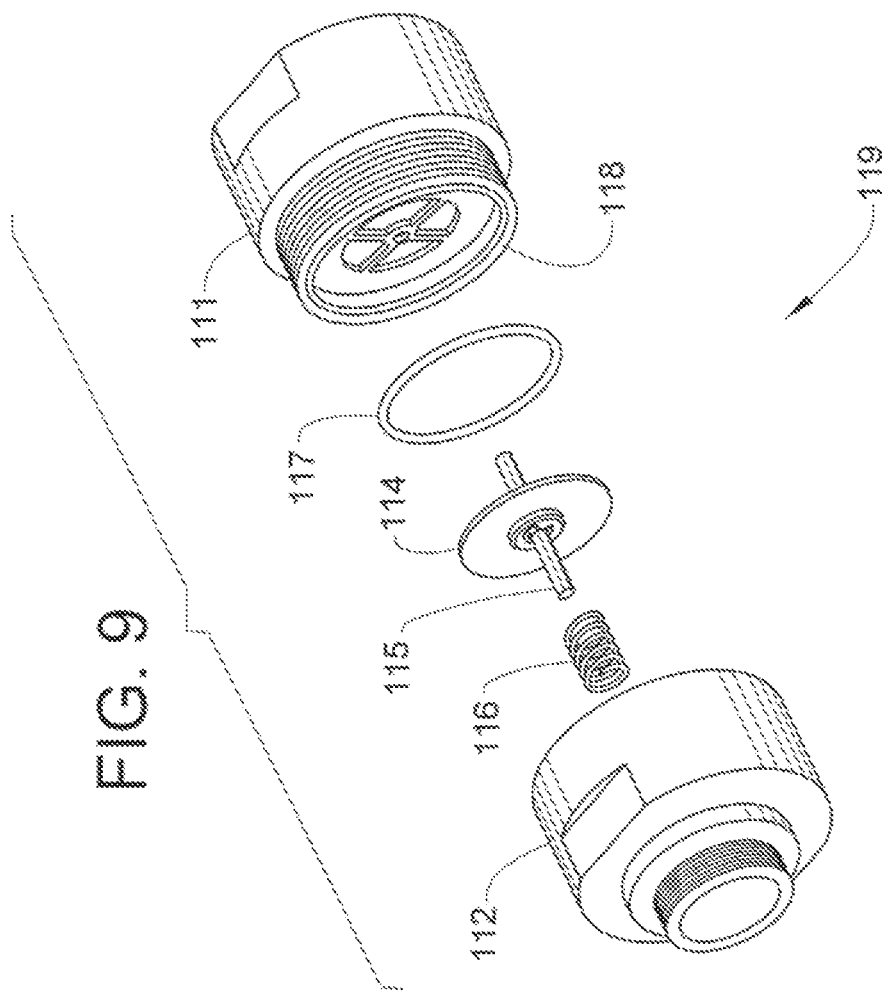
FIG. 9 is an exploded view of the breather check valve of FIG. 4.
Figure 10:
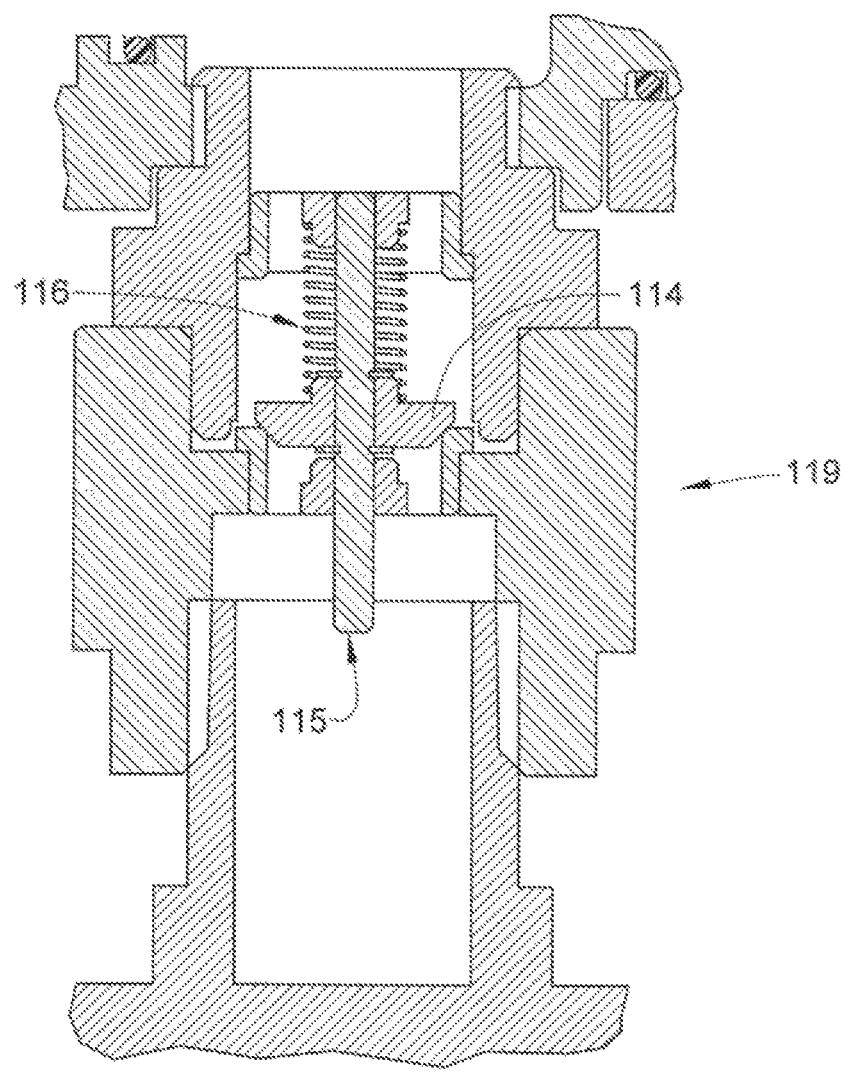
FIG. 10 is a sectional side view of a breather check valve, according to certain embodiments.

Also illustrated in FIG. 4 is a breather check valve assembly 119, according to certain embodiments. In this exemplary embodiment, the housing of the breather check valve assembly is comprised of a top portion 111 and a body portion 112. A breather check valve 113 is substantially enclosed within the housing. This may also be referred to as a breather poppet valve, in certain embodiments. The top portion 111 is configured such that a filter 110 may be attached to the top portion 111 of the breather check valve housing. In certain applications the filter may be in gas communication with the breather check valve assembly but not directly connected to it. This filter may be an air filter, other filters suitable for a particular application, other devices suitable for a particular application or combinations thereof. In certain applications, the filter may be directly connected and/or indirectly connected to the breather check valve assembly. For example, a hose may be used to connect the filter to the breather check valve assembly. Such an arrangement may permit the filter to be spaced apart from the breather check valve assembly. In addition, in certain applications at least two filters may be used, for example in series. The body portion 112 of the breather check valve housing is configured so that it may be attached to the other portion of the valve assembly. In this exemplary, the breather check valve (also referred to, in certain embodiments, as a breather poppet) includes a breather check valve sealing member (here a plate like structure) 114, a breather rod 115, a breather check valve force transferring member (here a spring) 116 and a breather o-ring 117. Certain components of the breather check valve are further illustrated in the exploded view of FIG. 9. The breather o-ring 117 is seated on an interior seating portion 118 of the top portion 111 of the housing. When the container is being filled, the breather check valve 119 is held in a closed position. The breather sealing member 114 is held against the o-ring 116 by a force transferring member 117, as illustrated in FIG. 4. During filling of the liquid container this closed position substantially prevents exhaust, liquid, foam and/or unwanted particles from reaching the filter 110 via the breather check valve 113, thus, limiting the damage to and/or shorting the life of the filter due to exhaust, liquid, foam and/or unwanted particles reaching the filter. For example, when a fuel tank is being filled with fuel, the exhaust existing via the valve assembly may contain unwanted components and/or unwanted particles that may damage the filter and/or reduce its life. During fueling, foam and/or surges of the fuel may also occur and it is desirable to prevent such foam and/or fuel from entering the filter. Another advantage of the breather check value is that it prevents and/or reduces liquid surges in the container from reaching the filter because the breather check value is in a closed position (or substantially closed position) in such situations. For example, if a fuel tank experiences a fuel surge due to movement of the heavy equipment during use, then the fuel will be prevented from reaching the air filter due to the closed position of breather check valve. When the liquid (for example, fuel) is being emptied and/or consumed from the liquid container, the difference in pressure created by the displaced liquid being consumed creates a sufficient pressure difference between the spring side of the plate and the filter side of the plate such that the plate 114 is urged away from the o-ring 117 along shaft 115 and overcoming the pressure of the spring 116, thus allowing gas (for example, air) that has been filtered by the filter 110 to enter the container via the breather check valve. FIG. 10 is a sectional side view of a breather check valve, according to certain embodiments. Other suitable structures may also be used in place of the breather check valve configuration illustrated in this embodiment.

Also shown in FIG. 1 and FIG. 4 is a breather float valve 80 that is adjacent the breather holes 72. The breather float valve 80 is formed from a breather float 81 and a rod 82. A platform 83 and the relief plate 71 guide rod 82. The breather float 81 is able to reciprocate along a portion of the length of the rod 82 between the relief plate 71 and the platform 83. The guide rod 82 is fixed to the breather float 81 with circlips. Other ways of fixing the rod to the float may also be used.

Figure 3:
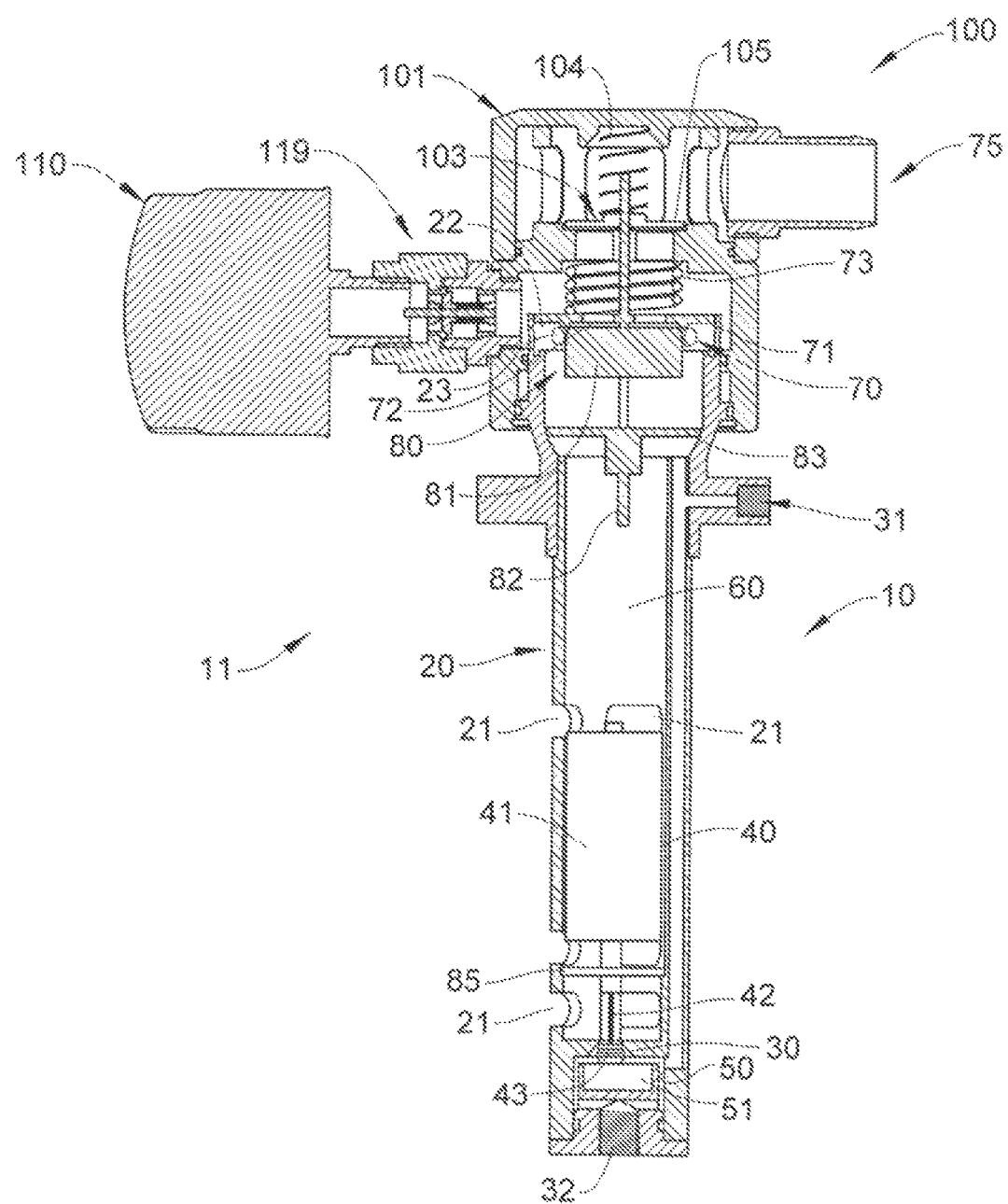
FIG. 3 is a section side view of the valve assembly of FIG. 1 with a relief valve in an open position.

The breather float valve 80 is in an open position when the breather float 81 is located adjacent the platform 83 and gas is free to pass through the breather holes 72. The breather float valve 80 is in a closed position when the breather float 81 is located over the breather holes 72 and liquid cannot pass through the breather holes 72 or is substantially reduced as to the amount of liquid that can pass through the breather holes 72, as illustrated in FIG. 3.

A relief valve 70 is also provided within top cap housing 101, as part of the valve assembly. The relief valve 70 is formed from the relief plate 71, a spring 73 and a portion of the body 102 of the valve assembly 100. The relief plate is able to move within a skirt 22. The skirt 22 has a number of circumferentially spaced relief holes 23. The spring 73 holds the relief plate at the base of the skirt 22. The spring 73 is held in position and a portion of the body of the breather assembly 102. The top portion of the spring is prevented from moving further towards the check valve 103 by a housing ridge 108.

In use, the float valve 11 has a number of functions. In operation, the inlet float valve 40 is in the open position such that the stem 42 sits within the shelter 51 as shown in FIG. 1. The bleed line 3 passes liquid in to the liquid chamber 50. The liquid then passes through the inlet 30, into the housing 20 and out the liquid holes 21 into the liquid tank. Turbulence that is created by the liquid passing through the liquid chamber 50 does not affect the valve seal 43 as it is located within the shelter 51 or the impact of turbulence from liquid and/or air is reduced or substantially reduced due to the locations of the valve seal 43 in relationship to the shelter 51.

Figure 2:
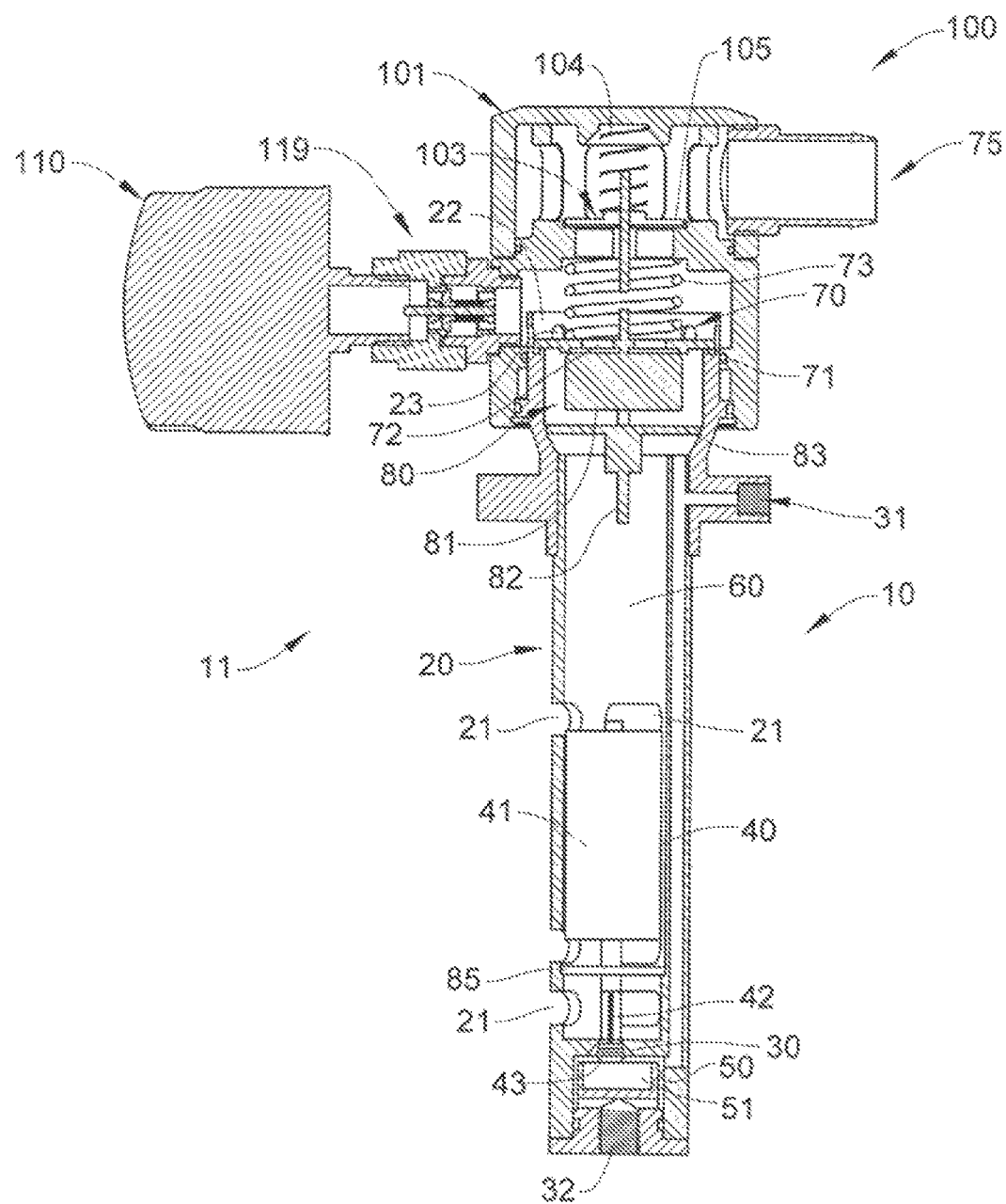
FIG. 2 is a section side view of the valve assembly of FIG. 1 with the float valve and the inlet float valve in a closed position.

As the liquid tank fills with liquid, the passageway 60 of the housing 20 also fills with liquid to a similar level. The inlet float 41 rises within the housing until the valve seal 43 blocks the inlet 30 as shown in FIG. 2. The pressure of the liquid within the bleed line, as well as the liquid within the tank acting on the float, maintains the valve seal 43 in position within the inlet 30. Once the inlet 30 is blocked, the bleed line 3 fills with liquid causing the flow control valve 2 to become closed and prevents further filling of the liquid tank or substantially prevents further filling of the liquid tank.

When the vehicle is moving, the housing 20 prevents damage of the inlet float valve 40 or substantially reduces damages to the inlet float valve 40. The impact forces created by surging liquid within the liquid tank impact the housing 20, not the inlet float valve 40.

However, the surging liquid can still extend up passageway 60 and up to the breather holes 72. The breather float valve 80 prevents this surging liquid from escaping through the breather holes 72 as the breather float 81 moves with the surging liquid blocking the breather holes 72 as shown in FIG. 2.

The breather float valve 80 also provides a failsafe during filling of the liquid tank. If the bleed line 3 is severed or the control valve fails or the inlet float valve fails, then a liquid supply nozzle (not shown) will continue to pump liquid into the liquid tank. The liquid tank will fill with liquid until the breather float 81 moves to the closed position to block the breather holes 72. The continued filling of the liquid tank creates pressure within the liquid tank. When the liquid tank reaches a liquid nozzle shut off pressure, then the liquid supply nozzle will shut-off stopping the liquid tank from rupturing.

However, if the liquid supply nozzle does not shut off automatically due to a mechanical fault, then the liquid supply nozzle will continue to supply liquid to the liquid tank via the flow control valve. This causes the pressure within the liquid tank to increase. At a pressure less than the rupture pressure of the tank, the pressure relief valve is opened as shown in FIG. 3. This occurs when the liquid tank pressure becomes greater than the spring pressure causing the relief plate 71 to move upwardly until it passes over the relief holes 23 in the skirt 22. Liquid then passes from the tank, through the relief holes 23, into the interior of the top cap housing 101 and through a cap hole 75. The liquid flowing from the top cap housing 101 will typically indicate to an operator to shut the liquid supply nozzle off manually or take other corrective actions.

The valve assembly provides a number of advantages and/or combinations of advantages. One advantage is use of the check valve and the breather check valve substantially prevents or reduces the chances of unwanted materials reaching portions of the valve assembly, the float valve, the filter, and other components of the fast fill system and/or the container. Another advantage is that during filling of the liquid container, the filter is protected from exhaust, unwanted particles, liquid surges and/or foaming reaching the filter from the container because the breather check valve is in a substantially closed (or closed) position. Another advantage is the container is substantially protected from unfiltered gas and/or unwanted particles entering the container via the check valve because when the container is not being filled the check valve of the valve assembly is in a closed position. Another advantage is that the float valve assembly is not damaged by surging liquid, making the float valve assembly suitable for use in moving vehicles or other equipment that may be subject to such surges. Another advantage is that the breather float valve prevents liquid from escaping via the valve assembly when the liquid surges within the liquid tank during movement of the vehicle or other equipment that may be subject to such conditions. Furthermore, in the event of failure of the inlet float valve, flow control valve or bleed line, the breather float valve prevents the loss of liquid by blocking the breather holes causing pressure build up within the liquid tank and thus causing the liquid supply nozzle to shut off. Another advantage is the pressure relief valve prevents the liquid tank from rupturing from over-pressurizing of the liquid tank. Another advantage is that the valve assembly may be easily retrofitted to existing float valves.

Other exemplary non-limiting embodiments are:

Example 1

A valve assembly comprising: a relief valve configured to be movable between a closed position and an open position to allow pressure from a container to be relieved through at least one relief hole; a breather float configured to be movable between an open position to allow gas to pass through at least one breather hole and a closed position that substantially prevents liquid from passing through the at least one breather hole; and at least one or more of the following: a check valve that is movable between a closed position and an open position to allow gas to be relieved from the container when the container is being filled with liquid; and a breather check valve that is movable between a closed position and an open position to allow filter gas to enter the container when liquid is being removed from the container.

Example 2

A valve assembly comprising: a check valve comprising: a check valve force transferring member; and a check valve sealing member that is movable between a closed position and an open position by application of a first force to the check valve force transferring member, wherein in the open position the check valve permits gas to be relieved from a container via the check valve when the container is being filled with liquid and, wherein the check valve is in the closed position after filling of the container in order to substantially prevent unfiltered air from entering a portion of the valve assembly and/or the container via the check valve; and a breather check valve comprising: a breather check valve force transferring member; and a breather check valve sealing member that is movable between a closed position and an open position by application of a second force to the breather check valve sealing member to allow filter gas to enter the container via the breather check valve when liquid is being removed from the container, and wherein the breather check valve sealing member is in the closed position during filling of the container to substantially prevent exhaust and/or foam from the container from exiting the container via the breather check valve.

Example 3

A valve assembly comprising: a relief valve comprising: a relief valve force transferring member, and a sealing member that is movable between a closed position and an open position by application of a force to the relief valve force transferring member to allow pressure to be relieved from a container through at least one relief hole; a breather float configured to be movable between an open position to allow gas to pass through at least one breather hole and a closed position that substantially prevents liquid from passing through the at least one breather hole; and at least one or more of the following: a check valve comprising: a check valve force transferring member; and a check valve sealing member that is movable between a closed position and an open position by application of a first force to the check valve force transferring member to allow gas to be relieved from the container via the check valve when the container is being filled with liquid; and a breather check valve comprising: a breather check valve force transferring member; and a breather check valve sealing member that is movable between a closed position and an open position by application of a second force to the breather check sealing member to allow filter gas to enter the container when liquid is being removed from the container.

Example 4

The valve assembly of one or more of the Examples, wherein a filter for filtering the gas before the gas enters the container is in gas communication with the check valve.

Example 5

The valve assembly of one or more of the Examples, wherein the breather check valve is in the closed position during filling of the container to substantially prevent exhaust and/or foam from the container from exiting the container via the breather check valve and contaminating the filter.

Example 6

The valve assembly of one or more of the Examples, wherein the breather check valve is in the closed position during liquid surges in the container to substantially prevent liquid from exiting the container via the breather check valve and contaminating the filter.

Example 7

The valve assembly of one or more of the Examples, wherein the check valve is in a closed position after filling of the container in order to substantially prevent unfiltered air from entering a portion of the valve assembly and/or the container via the check valve.

Example 8

The valve assembly of one or more of the Examples, wherein the valve assembly is configured to substantially prevent unfiltered air and unwanted particles from entering the container via the check valve and to substantially prevent exhaust, foam and/or liquid surges from the container from entering the filter via the breather check valve.

Example 9

The valve assembly of one or more of the Examples, wherein the check valve and the breather check valve are at least partially contained within a housing.

Example 10

The valve assembly of one or more of the Examples, wherein the valve assembly is a component of a fast fill system that allows rapid filling of a container with liquid and also protects the container from being overfilled and/or over pressurised.

Example 11

The valve assembly of one or more of the Examples, wherein the valve may be retrofitted to certain existing valves, float valves and/or float control valves.

Example 12

The valve assembly of one or more of the Examples, wherein the relief valve force transferring member is a spring and the sealing member is a plate.

Example 13

The valve assembly of one or more of the Examples, wherein the check valve force transferring member is a check valve spring and the check valve sealing member is a check valve poppet plate.

Example 14

The valve assembly of one or more of the Examples, wherein the breather check valve force transferring member is a breather check valve spring and the breather check valve sealing member is a breather check valve poppet plate.

Example 15

The valve assembly of one or more of the Examples, wherein the breather check valve is in the substantially closed position during liquid surges in the container to substantially prevent liquid surges from contaminating the filter.

Example 16

The valve assembly of one or more of the Examples, wherein the valve assembly is configured to substantially reduce one or more of the following: contamination of the liquid in the container, impedance of the proper operation of the valve assembly, the accumulation of unwanted particles in the valve assembly, impedance of the proper operation of other components of the fast fill system, the accumulation of unwanted particles in other components of the fast fill system, the contamination of the filter that is in gas communication with the check valve from exhaust, foam and or liquid from the liquid container, impedance of the proper operation of the equipment associated with the liquid container and the accumulation of unwanted particles and/or other substances in the equipment associated with the liquid container.

Example 17

A system comprising: a control valve; a bleed line; and a float valve connectable to the control valve via the bleed line, the float valve comprising: an aperture for connecting the bleed line to the float valve; a housing comprising a housing wall, a passageway that extends through the housing, and at least one hole through a wall of the housing; a liquid inlet, the liquid inlet allowing liquid to pass into the passageway of the housing; a liquid chamber located adjacent the liquid inlet into which liquid is passed before entering the passageway through the liquid inlet; an inlet float valve located at least partial within the housing and comprising a float and a stem, the inlet float valve movable between an open position that permits the flow of liquid through the liquid inlet into the passageway and through the at least one hole and a closed position that does not permit the flow of liquid through the liquid inlet into the passageway and through the at least one hole; a shelter located within the liquid chamber in which an end of the stem is located when the float valve is in the open position to reduce turbulence created by liquid passing through the chamber; wherein the passageway is fluidly connected to the aperture through the liquid inlet and the liquid chamber; a relief valve comprising: a relief valve force transferring member; and a relief member that is movable between a closed position and an open position by compression of the relief valve force transferring member to allow pressure to be relieved from the container through at least one relief hole; a second float configured to be movable between an open position to allow gas to pass through at least one breather hole and a closed position that prevents liquid from passing through the at least one breather hole; and at least one or more of the following: a check valve that is movable between a closed position and an open position to allow gas to be relieved from the container when the container is being filled with liquid; and a breather check valve that is movable between a closed position and an open position to allow filter gas to enter the container when liquid is being removed from the container.

Example 18

A system comprising: a control valve; a bleed line; and a float valve connectable to the control valve via the bleed line, the float valve comprising: a check valve comprising: a check valve force transferring member; and a check valve sealing member that is movable between a closed position and an open position by application of a first force to the check valve force transferring member, wherein in the open position the check valve permits gas to be relieved from a container via the check valve when the container is being filled with liquid and, wherein the check valve is in the closed position after filling of the container in order to substantially prevent unfiltered air from entering a portion of the float valve and/or the container via the check valve; and a breather check valve comprising: a breather check valve force transferring member; and a breather check valve sealing member that is movable between a closed position and an open position by application of a second force to the breather check valve sealing member to allow filter gas to enter the container via the breather check valve when liquid is being removed from the container, and wherein the breather check valve sealing member is in the closed position during filling of the container to substantially prevent exhaust and/or foam from the container from exiting the container via the breather check valve.

Example 19

The system of one or more of the Examples, wherein a filter for filtering the gas before the gas enters the container is in gas communication with the check valve.

Example 20

The system of one or more of the Examples, wherein the breather check valve is in the closed position during filling of the container to substantially prevent exhaust and/or foam from the container from exiting the container via the breather check valve and contaminating the filter.

Example 21

The system of one or more of the Examples, wherein the breather check valve is in the closed position during liquid surges in the container to substantially prevent liquid from exiting the container via the breather check valve and contaminating the filter.

Example 22

The system of one or more of the Examples, wherein the check valve is in a closed position after filling of the container in order to substantially prevent unfiltered air from entering a portion of the float valve and/or the container via the check valve.

Example 23

The system of one or more of the Examples, wherein the float valve is configured to substantially prevent unfiltered air and unwanted particles from entering the container via the check valve and to substantially prevent exhaust, foam and/or liquid surges from the container from entering the filter via the breather check valve.

Example 24

The system of one or more of the Examples, wherein the check valve and the breather check valve are at least partially contained within a housing.

Example 25

The system of one or more of the Examples, wherein the system is a fast fill system that allows rapid filling of a container with liquid and also protects the container from being overfilled and/or over pressurised.

Example 26

The system of one or more of the Examples, wherein a portion of the float valve comprising the check valve and the breather check valve may be retrofitted to certain existing valves, float valves and/or float control valves.

Example 27

The system of one or more of the Examples, wherein a portion of the float valve comprising the check valve, the breather check valve, the a relief valve and the second float may be retrofitted to certain existing valves, float valves and/or float control valves.

Example 28

The system of one or more of the Examples, wherein the relief valve force transferring member is a spring and the sealing member is a plate.

Example 29

The system of one or more of the Examples, wherein the check valve force transferring member is a check valve spring and the check valve sealing member is a check valve poppet plate.

Example 30

The system of one or more of the Examples, wherein the breather check valve force transferring member is a breather check valve spring and the breather check valve sealing member is a breather check valve poppet plate.

Example 31

The system of one or more of the Examples, wherein the breather check valve is in the substantially closed position during liquid surges in the container to substantially prevent liquid surges from contaminating the filter.

Example 32

The system of one or more of the Examples, wherein the float valve is configured to substantially reduce one or more of the following: contamination of the liquid in the container, impedance of the proper operation of the float valve, the accumulation of unwanted particles in the float valve, impedance of the proper operation of other components of the fast fill system, the accumulation of unwanted particles in other components of the fast fill system, the contamination of the filter that is in gas communication with the check valve from exhaust, foam and or liquid from the liquid container, impedance of the proper operation of the equipment associated with the liquid container and the accumulation of unwanted particles and/or other substances in the equipment associated with the liquid container.

Example 33

A method of filling or emptying a container of liquid further comprising the limitations of one or more of the above Examples.

Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. It should be appreciated that various other changes and modifications may be made to the embodiment described without departing from the spirit or scope of the inventions disclosed herein.

The invention claimed is:

1. A valve assembly for use in a valving system for a container for holding a fluid comprising a liquid and a gas, the valving system including an inlet float valve the valve assembly comprising,
   a main housing having an outlet, the main housing in use being in fluid communication with the container and providing for an exhaust route for fluid from the container to the outlet;
   a relief valve disposed within the main housing and including a relief plate movable between a relief valve closed position to a relief valve open position, the relief plate moving upwardly into the relief valve open position, the relief plate having at least one breather hole which forms part of the exhaust route;
a breather float valve disposed within the main housing adjacent to and upstream of the relief valve with respect to the fluid flow direction towards the outlet, the breather float valve including a breather float configured for movement between an open position, in which position flow can be effected through the at least one breather hole, and a closed position in which the breather float moves in a direction towards the relief plate so as to close the at least one breather hole;
a check valve disposed within the main housing downstream of the relief valve and breather float valve with respect to the fluid flow direction towards the outlet, the check valve including a sealing member which is moveable between a check valve open position, in which the sealing member moves in the upwards direction into the open position and a check valve closed position in which the sealing member moves in a downward position towards the relief valve and the breather float valve;
a breather check valve movable between an open position in which the breather check valve provides fluid communication between the exhaust route and externally of the housing, and a closed position.

2. A valve assembly according to claim 1, wherein the check valve disposed within the main housing includes a spring for urging the check valve into the check valve closed position, and the relief valve includes a relief valve spring for urging the relief plate into the relief valve closed position, the main housing comprising an interior section forming a valve seat for the sealing member and having a housing ridge preventing the relief valve spring from moving towards the check valve.

3. A valve assembly according to claim 1, wherein the breather check valve comprises a breather check valve housing operatively connected to the main housing, a breather check valve sealing member and associated valve seat disposed within the breather check valve housing.

4. The valve assembly according to claim 2, including a filter which is in gas communication with the breather check valve for filtering the gas before the gas enters the container.

5. The valve assembly according to claim 1, wherein the breather check valve is in the closed position during filling of the container to substantially prevent exhaust and/or foam from the container from exiting the container via the breather check valve and contaminating the filter.

6. The valve assembly according to claim 1, wherein the breather check valve is in the closed position during liquid surges in the container to substantially prevent liquid from exiting the container via the breather check valve and contaminating the filter.

7. The valve assembly according to claim 1, wherein the check valve disposed within the main housing is in the closed position after filling of the container in order to substantially prevent unfiltered air from entering a portion of the valve assembly and/or the container via the check valve.

8. The valve assembly according to claim 1, wherein the valve assembly is configured to substantially prevent unfiltered air and unwanted particles from entering the container via the check valve and to substantially prevent exhaust, foam and/or liquid surges from the container from entering the filter via the breather check valve.

9. The valve assembly according to claim 1, wherein the valve assembly is a component of a fast fill system that allows rapid filling of the container with liquid and also protects the container from being overfilled and/or over pressurized.

10. The valve assembly according to claim 1, wherein the valve assembly may be retrofitted to a float valve portion.

11. The valve assembly according to claim 1, wherein the breather check valve includes a force transferring member comprising a breather check valve spring, and a breather check valve sealing member comprising a breather check valve poppet plate.

12. The valve assembly according to claim 1, wherein the breather check valve is in the substantially closed position during liquid surges in the container to substantially prevent liquid surges from contaminating the filter.

13. The valve assembly according to claim 1, wherein the valve assembly is configured to substantially reduce one or more of the following: contamination of the liquid in the container, impedance of the proper operation of the valve assembly, accumulation of unwanted particles in the valve assembly, impedance of the proper operation of other components of a fast fill system, accumulation of unwanted particles in other components of the fast fill system, the contamination of the filter that is in gas communication with the check valve from exhaust, foam and or liquid from the liquid container, impedance of the proper operation of equipment associated with the liquid container and the accumulation of unwanted particles and/or other substances in the equipment associated with the liquid container.

14. A valve apparatus for use with the container for holding the fluid comprising the liquid and the gas, the valve apparatus comprising the valve assembly in accordance with claim 1, and the inlet float valve, wherein the inlet float valve includes an inlet float valve housing having a passageway which is in fluid communication with the exhaust route in the valve assembly main housing, the inlet float valve further including an inlet float movable between an open position and a closed position in which position the passageway is closed.

15. The valve apparatus according to claim 14, wherein:
the float valve housing comprises a housing wall, the passageway extending through the housing, and at least one hole through the wall of the housing;
a liquid inlet, the liquid inlet allowing liquid to pass into the passageway of the housing;
a liquid chamber located adjacent the liquid inlet into which liquid is passed from an aperture before entering the passageway through the liquid inlet;
the inlet float having a stem, the inlet float being movable between an open position that permits the flow of liquid through the liquid inlet into the passageway and through the at least one hole and a closed position that does not permit the flow of liquid through the liquid inlet into the passageway and through the at least one hole;
a shelter located within the liquid chamber in which an end of the stem is located when the float valve is in the open position to reduce turbulence created by liquid passing through the chamber;
wherein the passageway is fluidly connected to the aperture through the liquid inlet and the liquid chamber.

16. The valving system comprising the valve apparatus according to claim 15, a control valve and a bleed line, the inlet float valve being operatively connected to the control valve via the bleed line.

* * * * *